(12) United States Patent
Baulier et al.

(10) Patent No.: US 10,102,028 B2
(45) Date of Patent: Oct. 16, 2018

(54) DELIVERY ACKNOWLEDGMENT IN EVENT STREAM PROCESSING

(71) Applicant: SAS Institute Inc., Cary, NC (US)

(72) Inventors: Gerald Donald Baulier, Apex, NC (US); Scott J. Kolodzieski, Apex, NC (US); Vincent L. Deters, Wake Forest, NC (US)

(73) Assignee: SAS INSTITUTE INC., Cary, NC (US)

( * ) Notice: Subject to any disclaimer, the term of this patent is extended or adjusted under 35 U.S.C. 154(b) by 914 days.

(21) Appl. No.: 13/958,096

(22) Filed: Aug. 2, 2013

(65) Prior Publication Data

US 2014/0280986 A1    Sep. 18, 2014

Related U.S. Application Data

(60) Provisional application No. 61/777,324, filed on Mar. 12, 2013.

(51) Int. Cl.
| | | |
|---|---|---|
| G06F 9/46 | (2006.01) | |
| H04L 29/08 | (2006.01) | |
| H04L 29/12 | (2006.01) | |

(52) U.S. Cl.
CPC ............... *G06F 9/46* (2013.01); *H04L 61/35* (2013.01); *H04L 67/10* (2013.01)

(58) Field of Classification Search
CPC ......... H04L 41/00; H04L 67/00; H04L 67/10; H04L 61/35; G06F 9/46
See application file for complete search history.

(56) References Cited

U.S. PATENT DOCUMENTS

| | | |
|---|---|---|
| 5,351,276 A | 9/1994 | Doll, Jr. et al. |
| 5,691,917 A | 11/1997 | Harrison |

(Continued)

FOREIGN PATENT DOCUMENTS

| | | |
|---|---|---|
| CN | 101116057 | 1/2008 |
| CN | 100524223 | 8/2009 |

(Continued)

OTHER PUBLICATIONS

DataFlux Event Stream Processing Engine User's Guide, Version 1.3, Jan. 24, 2013.

(Continued)

*Primary Examiner* — Douglas B Blair
*Assistant Examiner* — Jihad Kamal Boustany
(74) *Attorney, Agent, or Firm* — Bell & Manning, LLC

(57) ABSTRACT

A method of acknowledging receipt of an event block object is provided. First connection information for connecting to an event stream processing (ESP) engine executing at a first computing device is received. A first connection to the ESP engine is established using the received first connection information. Second connection information for connecting to a publishing client executing at a second computing device is received. A second connection to the publishing client is established using the received second connection information, wherein the first connection differs from the second connection. An event block object is received from the ESP engine using the established first connection, wherein the event block object includes a unique identifier for the event block object. Successful processing of the event block object is determined. Responsive to the successful processing determination, an acknowledgment message including the unique identifier is sent to the publishing client using the established second connection.

37 Claims, 11 Drawing Sheets

(56) References Cited

U.S. PATENT DOCUMENTS

| | | | |
|---|---|---|---|
| 5,845,280 A | 12/1998 | Treadwell, III et al. | |
| 5,892,818 A * | 4/1999 | Lee | H04M 3/365 379/112.04 |
| 6,292,905 B1 | 9/2001 | Wallach et al. | |
| 6,449,618 B1 | 9/2002 | Blott et al. | |
| 6,496,831 B1 | 12/2002 | Baulier et al. | |
| 6,502,133 B1 | 12/2002 | Baulier et al. | |
| 6,681,230 B1 | 1/2004 | Blott et al. | |
| 6,920,475 B1 * | 7/2005 | Klots | G06F 9/5044 709/201 |
| 7,051,029 B1 * | 5/2006 | Fayyad | G06F 17/30876 |
| 7,158,492 B2 * | 1/2007 | Haverinen | H04L 29/06 370/237 |
| 7,395,536 B2 * | 7/2008 | Verbeke | G06F 9/5055 709/200 |
| 7,984,040 B2 | 7/2011 | Mishra et al. | |
| 8,065,319 B2 | 11/2011 | Ding et al. | |
| 8,099,452 B2 | 1/2012 | Chkodrov et al. | |
| 8,103,714 B2 | 1/2012 | Dorai et al. | |
| 8,150,951 B2 * | 4/2012 | O'Rourke | H04L 12/2859 709/223 |
| 8,326,822 B2 | 12/2012 | Mishra et al. | |
| 8,726,278 B1 * | 5/2014 | Shawver | G06F 9/4881 718/100 |
| 8,949,801 B2 | 2/2015 | Andrade et al. | |
| 8,954,665 B2 | 2/2015 | Czezatke et al. | |
| 9,158,810 B2 | 10/2015 | Aingaran et al. | |
| 2001/0005883 A1 * | 6/2001 | Wray et al. | 713/151 |
| 2001/0056554 A1 | 12/2001 | Chrabaszcz | |
| 2002/0077077 A1 * | 6/2002 | Rezvani et al. | 455/410 |
| 2003/0056002 A1 * | 3/2003 | Trethewey | H04L 67/1002 709/238 |
| 2003/0093579 A1 | 5/2003 | Zimmer et al. | |
| 2004/0064600 A1 | 4/2004 | Lee et al. | |
| 2005/0015437 A1 * | 1/2005 | Strait | H04L 67/10 709/203 |
| 2006/0153185 A1 | 7/2006 | Jain et al. | |
| 2007/0006231 A1 | 1/2007 | Wang et al. | |
| 2007/0103984 A1 | 5/2007 | Kavuri et al. | |
| 2008/0052556 A1 | 2/2008 | Donovan et al. | |
| 2008/0062863 A1 * | 3/2008 | Ginde | H04L 12/66 370/221 |
| 2008/0101278 A1 * | 5/2008 | Bengtsson et al. | 370/328 |
| 2008/0285553 A1 | 11/2008 | Abdulla et al. | |
| 2008/0301135 A1 * | 12/2008 | Alves et al. | 707/6 |
| 2009/0037769 A1 | 2/2009 | Babkin et al. | |
| 2009/0063548 A1 | 3/2009 | Rusher et al. | |
| 2009/0199209 A1 * | 8/2009 | Arimilli | G06F 9/542 719/314 |
| 2010/0146243 A1 | 6/2010 | Balko et al. | |
| 2010/0325287 A1 * | 12/2010 | Jagadeeswaran | H04L 67/22 709/227 |
| 2011/0022883 A1 | 1/2011 | Hansen | |
| 2011/0040863 A1 * | 2/2011 | Griffin | H04L 67/1095 709/223 |
| 2011/0072151 A1 | 3/2011 | Sharma et al. | |
| 2012/0246391 A1 | 9/2012 | Meir et al. | |
| 2013/0246580 A1 | 9/2013 | Ozawa et al. | |
| 2014/0047377 A1 | 2/2014 | Nos et al. | |

FOREIGN PATENT DOCUMENTS

| | | |
|---|---|---|
| CN | 101578590 | 11/2009 |
| WO | WO 2007024844 | 3/2007 |

OTHER PUBLICATIONS

Baulier et al., A Database System for Real-Time Event Aggregation in Telecommunication, Proceedings of the 24th VLDB Conference, New York, 1998, pp. 680-684.

Baulier et al., Sunrise: A Real-Time Event-Processing System, Bell Labs Technical Journal, 1998, pp. 3-18.

International Search Report and Written Opinion mailed in PCT/US15/32370 dated Aug. 24, 2015.

\* cited by examiner

DELIVERY ACKNOWLEDGMENT IN EVENT STREAM PROCESSING

CROSS-REFERENCE TO RELATED APPLICATIONS

The present application claims priority under 35 U.S.C. § 119(e) to U.S. Provisional Patent Application No. 61/777,324 filed Mar. 12, 2013, the entire contents of which are hereby incorporated by reference.

BACKGROUND

An increasing number of distributed applications process continuously flowing data from geographically distributed sources by applying complex queries to the data before distributing the data to geographically distributed recipients. An event stream processing engine (ESPE) continuously analyzes the data as it is received and determines which entities receive the processed data. The ESPE processes the streams of data coming from different sources to produce streams of new data as an output by executing standing queries, which run continuously and provide updated results as new data arrives.

Publish-subscribe is a message oriented interaction paradigm based on indirect addressing. Processed data recipients specify their interest in receiving information from the ESPE by subscribing to specific classes of events, while information sources publish events to the ESPE without directly addressing the receiving parties. The ESPE coordinates the interactions and processes the data. In some cases, the data source receives confirmation that the published information has been received by a data recipient.

SUMMARY

In an example embodiment, a method of acknowledging receipt of an event block object is provided. First connection information for connecting to an event stream processing (ESP) engine executing at a first computing device is received. A first connection to the ESP engine is established using the received first connection information. Second connection information for connecting to a publishing client executing at a second computing device is received. A second connection to the publishing client is established using the received second connection information. The first connection differs from the second connection. An event block object is received from the ESP engine using the established first connection. The event block object includes a unique identifier for the event block object. Successful processing of the event block object is determined. Responsive to the successful processing determination, an acknowledgment message including the unique identifier is sent to the publishing client using the established second connection.

In another example embodiment, a computer-readable medium is provided having stored thereon computer-readable instructions that when executed by a computing device, cause the computing device to perform the method of acknowledging receipt of an event block object.

In yet another example embodiment, a system is provided. The system includes, but is not limited to, a processor and a computer-readable medium operably coupled to the processor. The computer-readable medium has instructions stored thereon that, when executed by the processor, cause the system to perform the method of acknowledging receipt of an event block object.

In still another example embodiment, a method of confirming receipt of an event block object is provided. First connection information for connecting to an ESP engine executing at a first computing device is received. A first connection to the ESP engine is established using the received first connection information. A second connection to a subscribing client executing at a second computing device is established. The first connection differs from the second connection. An event block object is published to the ESP engine using the established first connection. The event block object includes a unique identifier for the event block object. An acknowledgment message is received from the subscribing client through the established second connection. The acknowledgement message includes the unique identifier.

In still another example embodiment, a computer-readable medium is provided having stored thereon computer-readable instructions that when executed by a computing device, cause the computing device to perform the method of confirming receipt of an event block object.

In still another example embodiment, a system is provided. The system includes, but is not limited to, a processor and a computer-readable medium operably coupled to the processor. The computer-readable medium has instructions stored thereon that, when executed by the processor, cause the system to perform the method of confirming receipt of an event block object.

In still another example embodiment, a system is provided. The system includes, but is not limited to, a first computing device and a second computing device. The first computing device includes, but is not limited to, a first processor and a first computer-readable medium operably coupled to the first processor. The first computer-readable medium has instructions stored thereon that, when executed by the first processor, cause the first computing device to perform the method of acknowledging receipt of an event block object. The second computing device includes, but is not limited to, a second processor and a second computer-readable medium operably coupled to the second processor. The second computer-readable medium has second instructions stored thereon that, when executed by the second processor, cause the second computing device to receive an initial event block object from the publishing client, process the initial event block object to form the event block object, and send the formed event block object to the first computing device using the established first connection.

Other principal features of the current disclosure will become apparent to those skilled in the art upon review of the following drawings, the detailed description, and the appended claims.

BRIEF DESCRIPTION OF THE DRAWINGS

Illustrative embodiments will be described referring to the accompanying drawings, wherein like numerals denote like elements.

DETAILED DESCRIPTION

Figure 1:
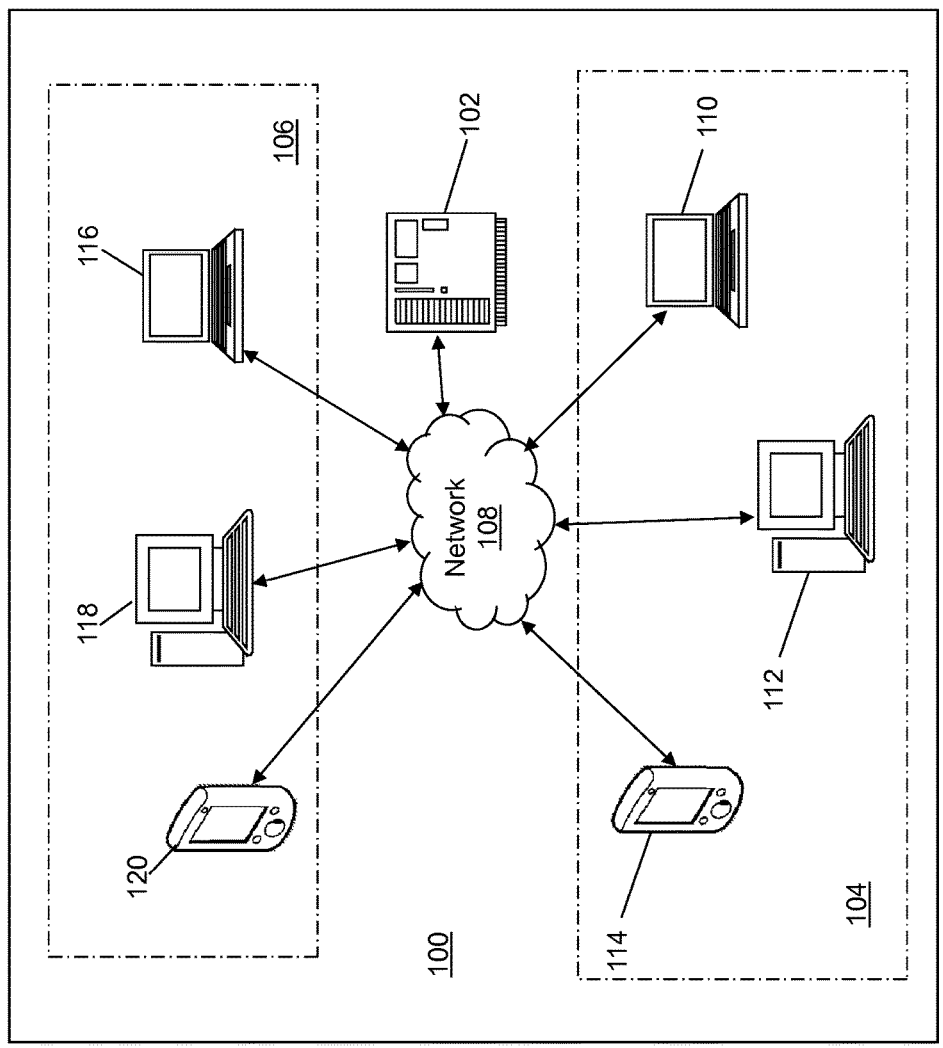
FIG. 1 depicts a block diagram of an event stream processing (ESP) system in accordance with an illustrative embodiment.

Referring to FIG. 1, a block diagram of an event stream processing (ESP) system 100 is shown in accordance with an illustrative embodiment. In an illustrative embodiment, ESP system 100 may include an ESP device 102, event publishing systems 104, event subscribing systems 106, and a network 108. The event publishing systems 104 publish data to ESP device 102. As used herein, the data may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. ESP device 102 processes the published data. The event subscribing systems 106 subscribe to and receive the published data after processing by ESP device 102.

The components of ESP system 100 may be included in a single computing device, may be positioned in a single room or adjacent rooms, in a single facility, and/or may be distributed geographically from one another. Thus, ESP device 102, the event publishing systems 104, and the event subscribing systems 106 may be composed of one or more discrete devices, one or more of ESP device 102, the event publishing systems 104, and the event subscribing systems 106 may be integrated into a single device.

Network 108 may include one or more networks of the same or different types. Network 108 can be any type of wired and/or wireless public or private network including a cellular network, a local area network, a wide area network such as the Internet, etc. Network 108 further may comprise sub-networks and consist of any number of devices.

ESP device 102 can include any number and type of computing devices that may be organized into subnets. The computing devices send and receive signals through network 108 to/from another of the one or more computing devices of ESP device 102, to/from event publishing systems 104, and/or to/from event subscribing systems 106. ESP device 102 may communicate using various transmission media that may be wired and/or wireless as understood by those skilled in the art.

The event publishing systems 104 can include any number and type of computing devices that may be organized into subnets. The computing devices of the event publishing systems 104 send and receive signals through network 108 to/from another of the one or more computing devices of the event publishing systems 104, to/from ESP device 102, and/or to/from the event subscribing systems 106. The one or more computing devices of the event publishing systems 104 may include computers of any form factor such as a laptop 110, a desktop 112, a smart phone 114, a personal digital assistant, an integrated messaging device, a tablet computer, etc. The one or more computing devices of the event publishing systems 104 may communicate using various transmission media that may be wired and/or wireless as understood by those skilled in the art.

The event subscribing systems 106 can include any number and type of computing devices that may be organized into subnets. The computing devices of the event subscribing systems 106 send and receive signals through network 108 to/from another of the one or more computing devices of the event subscribing systems 106, to/from ESP device 102, and/or to/from the event publishing systems 104. The one or more computing devices of the event subscribing systems 106 may include computers of any form factor such as a laptop 116, a desktop 118, a smart phone 120, an integrated messaging device, a personal digital assistant, a tablet computer, etc. The one or more computing devices of the event subscribing systems 106 may communicate using various transmission media that may be wired and/or wireless as understood by those skilled in the art.

Figure 2:
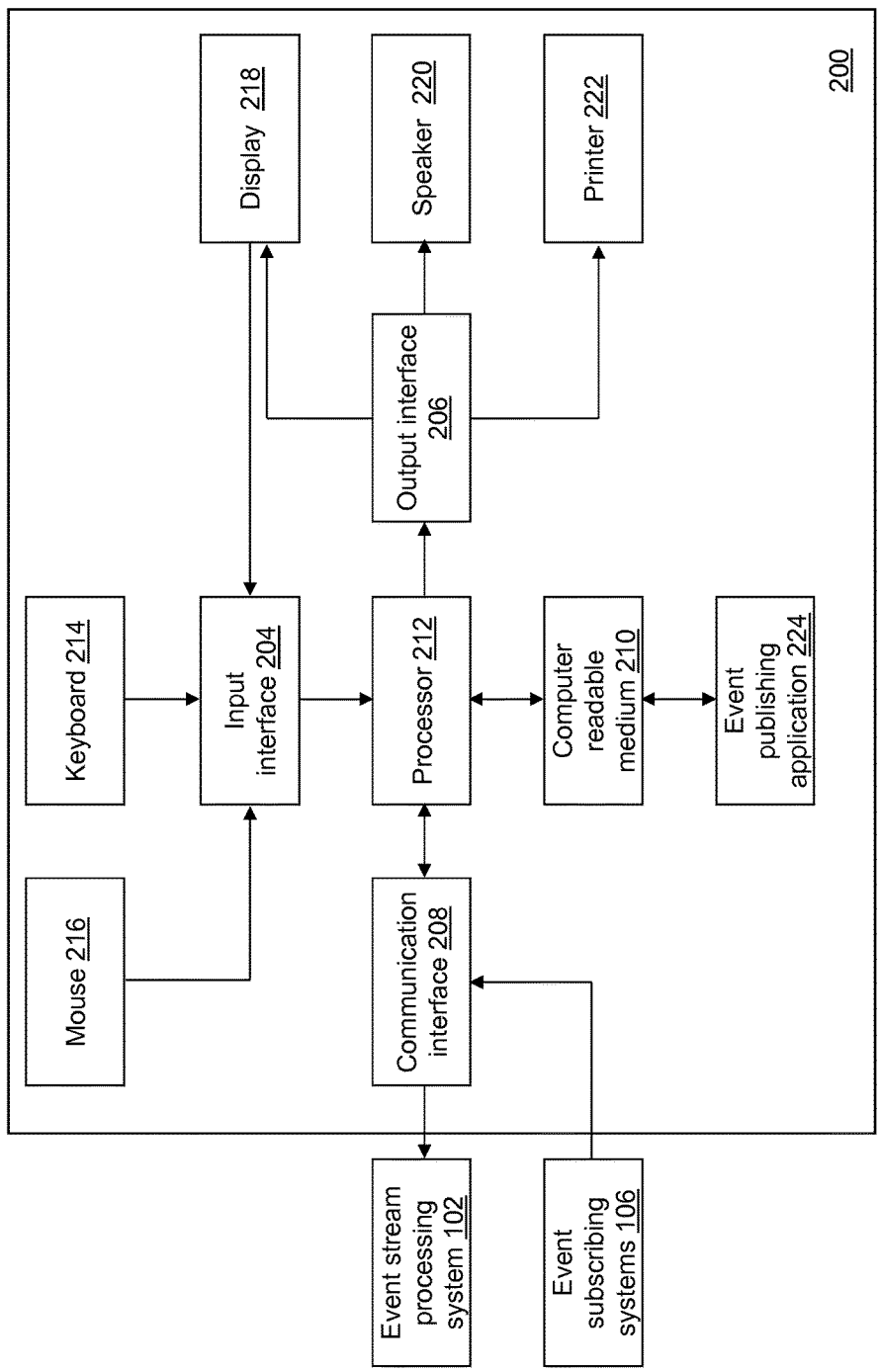
FIG. 2 depicts a block diagram of a publishing device of the ESP system of FIG. 1 in accordance with an illustrative embodiment.

Referring to FIG. 2, a block diagram of a publishing device 200 of the event publishing systems 104 is shown in accordance with an illustrative embodiment. Publishing device 200 is an example computing device of the event publishing systems 104. Publishing device 200 may include an input interface 204, an output interface 206, a communication interface 208, a computer-readable medium 210, a processor 212, a keyboard 214, a mouse 216, a display 218, a speaker 220, a printer 222, and an event publishing application 224. Fewer, different, and additional components may be incorporated into publishing device 200.

Input interface 204 provides an interface for receiving information from the user for entry into publishing device 200 as understood by those skilled in the art. Input interface 204 may interface with various input technologies including, but not limited to, keyboard 214, mouse 216, display 218, a track ball, a keypad, one or more buttons, etc. to allow the user to enter information into publishing device 200 or to make selections presented in a user interface displayed on display 218. The same interface may support both input interface 204 and output interface 206. For example, a display comprising a touch screen both allows user input and presents output to the user. Publishing device 200 may have one or more input interfaces that use the same or a different input interface technology. Keyboard 214, mouse 216, display 218, etc. further may be accessible by publishing device 200 through communication interface 208.

Output interface 206 provides an interface for outputting information for review by a user of publishing device 200. For example, output interface 206 may interface with various output technologies including, but not limited to, display 218, speaker 220, printer 222, etc. Display 218 may be a thin film transistor display, a light emitting diode display, a liquid crystal display, or any of a variety of different displays understood by those skilled in the art. Speaker 220 may be any of a variety of speakers as understood by those skilled in the art. Printer 222 may be any of a variety of printers as understood by those skilled in the art. Publishing device 200 may have one or more output interfaces that use the same or a different interface technology. Display 218, speaker 220, printer 222, etc. further may be accessible by publishing device 200 through communication interface 208.

Communication interface 208 provides an interface for receiving and transmitting data between devices using various protocols, transmission technologies, and media as understood by those skilled in the art. Communication interface 208 may support communication using various transmission media that may be wired and/or wireless. Publishing device 200 may have one or more communication interfaces that use the same or a different communication interface technology. Data and messages may be transferred between publishing device 200 and ESP device 102 and/or the event subscribing systems 106 using communication interface 208.

Computer-readable medium 210 is an electronic holding place or storage for information so the information can be accessed by processor 212 as understood by those skilled in the art. Computer-readable medium 210 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Publishing device 200 may have one or more computer-readable media that use the same or a different memory media technology. Publishing device 200 also may have one or more drives that support the loading of a memory media such as a CD or DVD.

Processor 212 executes instructions as understood by those skilled in the art. The instructions may be carried out by a special purpose computer, logic circuits, or hardware circuits. Processor 212 may be implemented in hardware, firmware, or any combination of these methods and/or in combination with software. The term "execution" is the process of running an application or the carrying out of the operation called for by an instruction. The instructions may be written using one or more programming language, scripting language, assembly language, etc. Processor 212 executes an instruction, meaning it performs/controls the operations called for by that instruction. Processor 212 operably couples with input interface 204, with output interface 206, with communication interface 208, and with computer-readable medium 210 to receive, to send, and to process information. Processor 212 may retrieve a set of instructions from a permanent memory device and copy the instructions in an executable form to a temporary memory device that is generally some form of RAM. Publishing device 200 may include a plurality of processors that use the same or a different processing technology.

Event publishing application 224 performs operations associated with creating and outputting data. Some or all of the operations described herein may be embodied in event publishing application 224. The operations may be implemented using hardware, firmware, software, or any combination of these methods. Referring to the example embodiment of FIG. 2, event publishing application 224 is implemented in software (comprised of computer-readable and/or computer-executable instructions) stored in computer-readable medium 210 and accessible by processor 212 for execution of the instructions that embody the operations of image creation and processing application 224. Event publishing application 224 may be written using one or more programming languages, assembly languages, scripting languages, etc.

Event publishing application 224 may be implemented as a Web application. For example, event publishing application 224 may be configured to receive hypertext transport protocol (HTTP) responses from other computing devices such as those associated with event subscribing systems 106 and/or ESP device 102 and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol. The file accessed may be a simple text file, an image file, an audio file, a video file, an executable, a common gateway interface application, a Java applet, an extensible markup language (XML) file, or any other type of file supported by HTTP.

Figure 3:
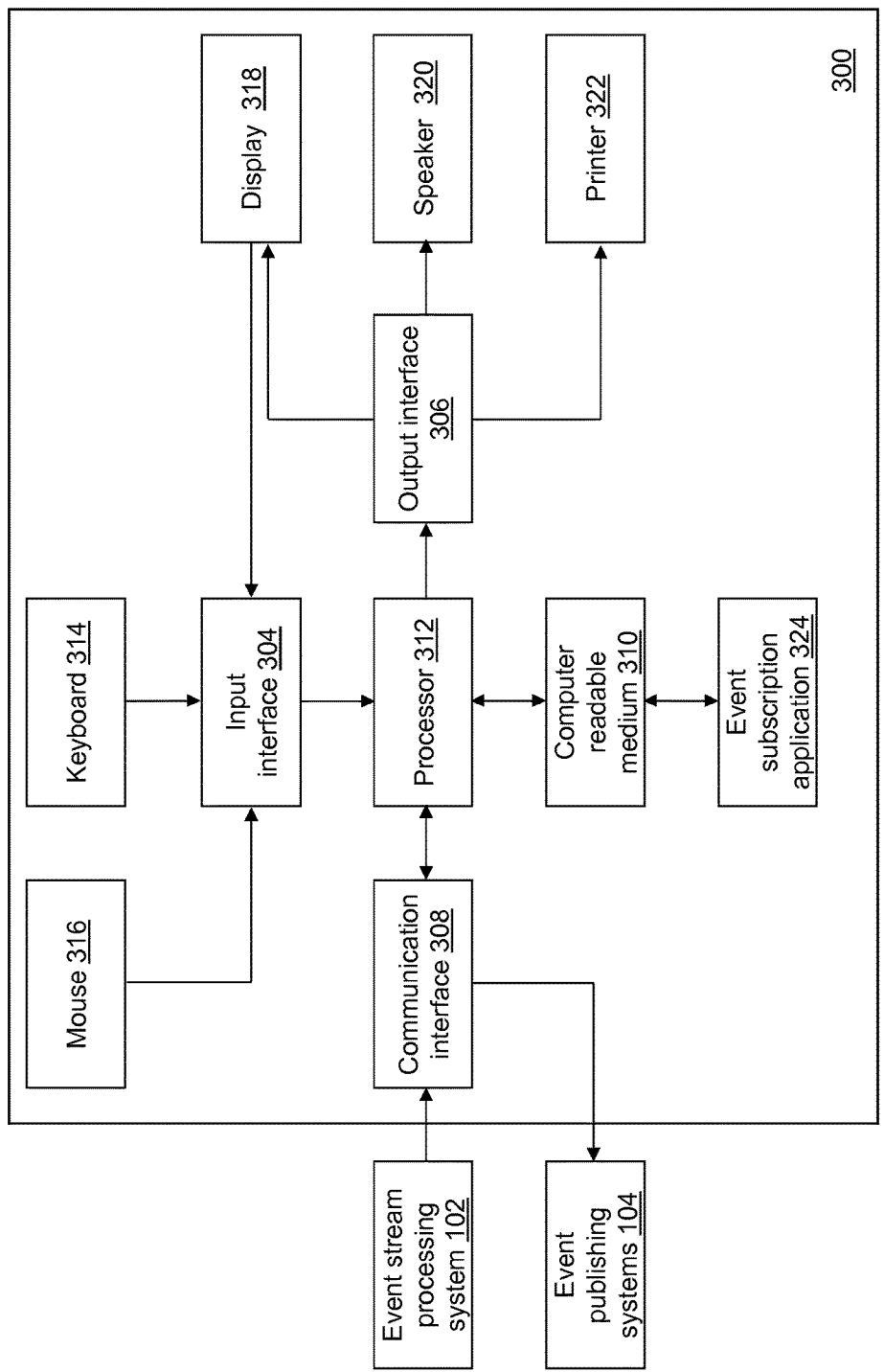
FIG. 3 depicts a block diagram of a subscribing device of the ESP system of FIG. 1 in accordance with an illustrative embodiment.

Referring to FIG. 3, a block diagram of an event subscribing device 300 of the event subscribing systems 106 is shown in accordance with an example embodiment. Event subscribing device 300 is an example computing device of the event subscribing systems 106. Event subscribing device 300 may include a second input interface 304, a second output interface 306, a second communication interface 308, a second computer-readable medium 310, a second processor 312, a second keyboard 314, a second mouse 316, a second display 318, a second speaker 320, a second printer 322, and an event subscription application 324. Fewer, different, and additional components may be incorporated into event subscribing device 300.

Second input interface 304 provides the same or similar functionality as that described with reference to input interface 204 of publishing device 200 though referring to event subscribing device 300 instead of publishing device 200. Second output interface 306 provides the same or similar functionality as that described with reference to output interface 206 of publishing device 200 though referring to event subscribing device 300 instead of publishing device 200. Second communication interface 308 provides the same or similar functionality as that described with reference to communication interface 208 of publishing device 200 though referring to event subscribing device 300 instead of publishing device 200. Data and messages may be transferred between event subscribing device 300 and ESP device 102 and/or the event publishing systems 104 using second communication interface 308. Second computer-readable medium 310 provides the same or similar functionality as that described with reference to computer-readable medium 210 of publishing device 200 though referring to event subscribing device 300 instead of publishing device 200. Second processor 312 provides the same or similar functionality as that described with reference to processor 212 of publishing device 200 though referring to event subscribing device 300 instead of publishing device 200. Second keyboard 314 provides the same or similar functionality as that described with reference to keyboard 214 of publishing device 200 though referring to event subscribing device 300 instead of publishing device 200. Second mouse 316 provides the same or similar functionality as that described with reference to mouse 216 of publishing device 200 though referring to event subscribing device 300 instead of publishing device 200. Second display 318 provides the same or similar functionality as that described with reference to display 218 of publishing device 200 though referring to event subscribing device 300 instead of publishing device 200. Second speaker 320 provides the same or similar functionality as that described with reference to speaker 220 of publishing device 200 though referring to event subscribing device 300 instead of publishing device 200. Second printer 322 provides the same or similar functionality as that described with reference to printer 222 of publishing device 200 though referring to event subscribing device 300 instead of publishing device 200.

Event subscription application 324 performs operations associated with receiving the data published by the one or more computing devices of the event publishing systems 104 and processed by ESP device 102. Some or all of the operations described herein may be embodied in event subscription application 324. The operations may be implemented using hardware, firmware, software, or any combination of these methods. Referring to the example embodiment of FIG. 3, event subscription application 324 is implemented in software (comprised of computer-readable and/or computer-executable instructions) stored in second computer-readable medium 310 and accessible by second processor 312 for execution of the instructions that embody the operations of event subscription application 324. Event subscription application 324 may be written using one or more programming languages, assembly languages, scripting languages, etc.

Event subscription application 324 may be implemented as a Web application. For example, event subscription application 324 may be configured to receive HTTP responses from other computing devices such as those associated with event publishing systems 104 and/or ESP device 102 and to send HTTP requests. The HTTP responses may include web pages such as HTML documents and linked objects generated in response to the HTTP requests. Each web page may be identified by a URL that includes the location or address of the computing device that contains the resource to be accessed in addition to the location of the resource on that computing device. The type of file or resource depends on the Internet application protocol. The file accessed may be a simple text file, an image file, an audio file, a video file, an executable, a common gateway interface application, a Java applet, an XML file, or any other type of file supported by HTTP.

Figure 4:
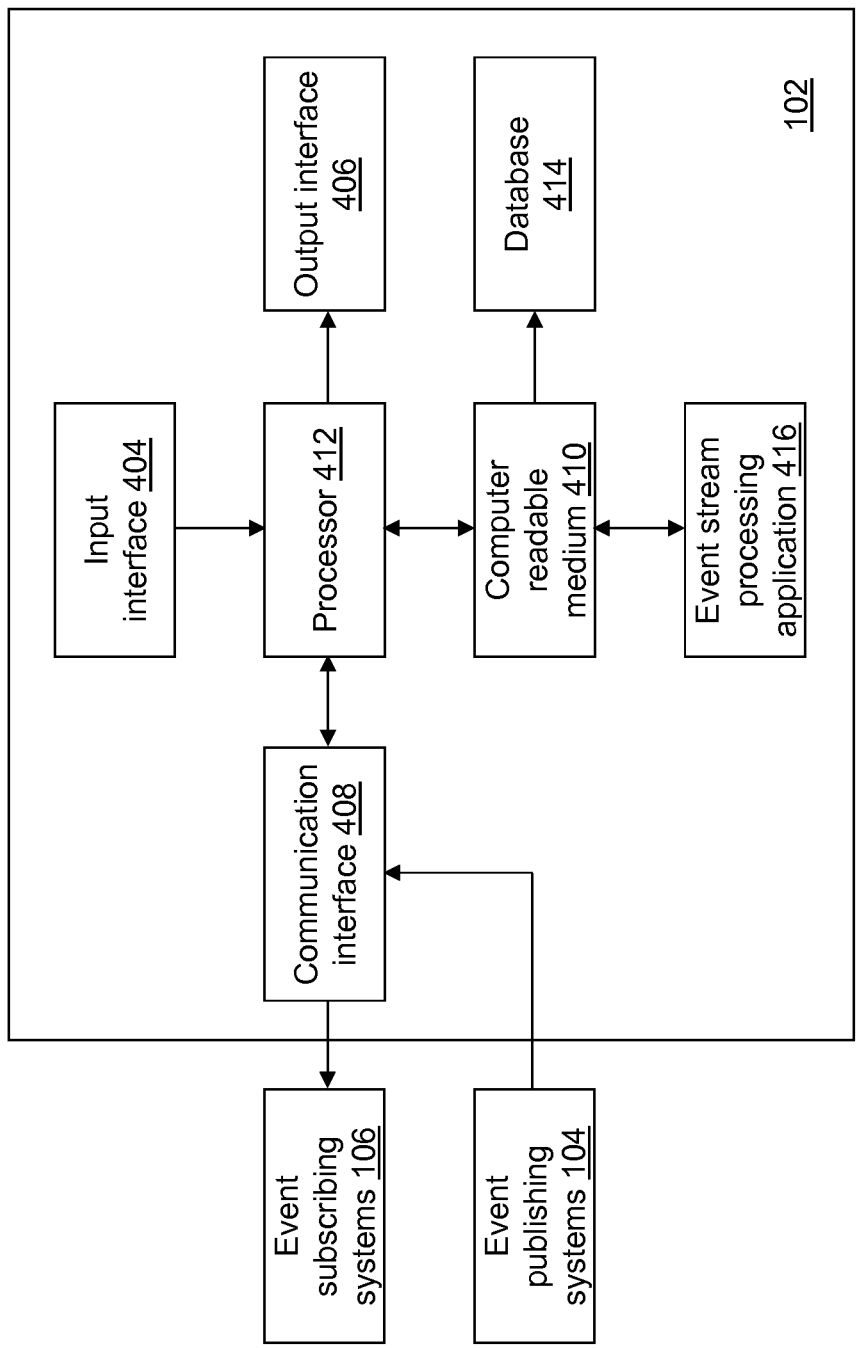
FIG. 4 depicts a block diagram of an ESP device of the ESP system of FIG. 1 in accordance with an illustrative embodiment.

Referring to FIG. 4, a block diagram of ESP device 102 is shown in accordance with an illustrative embodiment. ESP device 102 may include one or more computers of any form factor. ESP device 102 may include a third input interface 404, a third output interface 406, a third communication interface 408, a third computer-readable medium 410, a third processor 412, a database 414, and an ESP application 416. Fewer, different, and additional components may be incorporated into ESP device 102.

Third input interface 404 provides the same or similar functionality as that described with reference to input interface 204 of publishing device 200 though referring to ESP device 102 instead of publishing device 200. Third output interface 406 provides the same or similar functionality as that described with reference to output interface 206 of publishing device 200 though referring to ESP device 102 instead of publishing device 200. Third communication interface 408 provides the same or similar functionality as that described with reference to communication interface 208 of publishing device 200 though referring to ESP device 102 instead of publishing device 200. Data and messages may be transferred between ESP device 102 and the event subscribing systems 106 and/or the event publishing systems 104 using third communication interface 408. Third computer-readable medium 410 provides the same or similar functionality as that described with reference to computer-readable medium 210 of publishing device 200 though referring to ESP device 102 instead of publishing device 200. Third processor 412 provides the same or similar functionality as that described with reference to processor 212 of publishing device 200 though referring to ESP device 102 instead of publishing device 200.

ESP device 102 includes or can access database 414 either through a direct connection or through network 108 using third communication interface 408. Third computer-readable medium 410 may provide the electronic storage medium for database 414. Database 414 is a data repository for ESP system 100. Database 414 may include a plurality of databases that may be organized into multiple database tiers to improve data management and access. Database 414 may utilize various database technologies and a variety of formats as understood by those skilled in the art including a file system, a relational database, a system of tables, a structured query language database, etc. Database 414 may be implemented as a single database or as multiple databases stored in different storage locations distributed over the Internet or other heterogeneous storage infrastructures. Database 414 further may be implemented as a shared grid distributed across multiple computing devices.

ESP application 416 performs operations associated with processing data created by the one or more computing devices of the event publishing systems 104 and sending the processed data to the one or more computing devices of the event subscribing systems 106 based on the subscription request of each computing device of the event subscribing systems 106. ESP application 416 may embed an ESP engine (ESPE) with its own dedicated thread pool or pools into its application space where the main application thread can do application-specific work and the ESPE processes event streams by creating an instance of a model into processing objects. Some or all of the operations described herein may be embodied in ESP application 416. The operations may be implemented using hardware, firmware, software, or any combination of these methods. Referring to the example embodiment of FIG. 4, ESP application 416 is implemented in software (comprised of computer-readable and/or computer-executable instructions) stored in third computer-readable medium 410 and accessible by third processor 412 for execution of the instructions that embody the operations of ESP application 416. ESP application 416 may be written using one or more programming languages, assembly languages, scripting languages, etc.

ESP application 416 may be implemented as a Web application. For example, ESP application 416 may be configured to accept HTTP requests from client devices such as those associated with event publishing systems 104 and event subscribing systems 106 and to send HTTP responses with optional additional data content which may include web pages such as HTML documents and linked objects in response to the HTTP requests.

Event subscription application 324, event publishing application 224, and ESP application 416 may save or store data to database 414 and access or retrieve data from database 414. Event subscription application 324, event publishing application 224, and ESP application 416 may be the same or different applications or part of an integrated, distributed application supporting some or all of the same or additional types of functionality as described herein. As an example, the functionality provided by ESP application 416 may be provided as part of the DataFlux ESP Engine offered by SAS Institute Inc. and/or ESP applications offered by other software vendors. Various levels of integration between the components of ESP system 100 may be implemented without limitation as understood by a person of skill in the art. For example, all of the functionality described for ESP system 100 may be implemented in a single computing device.

Figure 5:
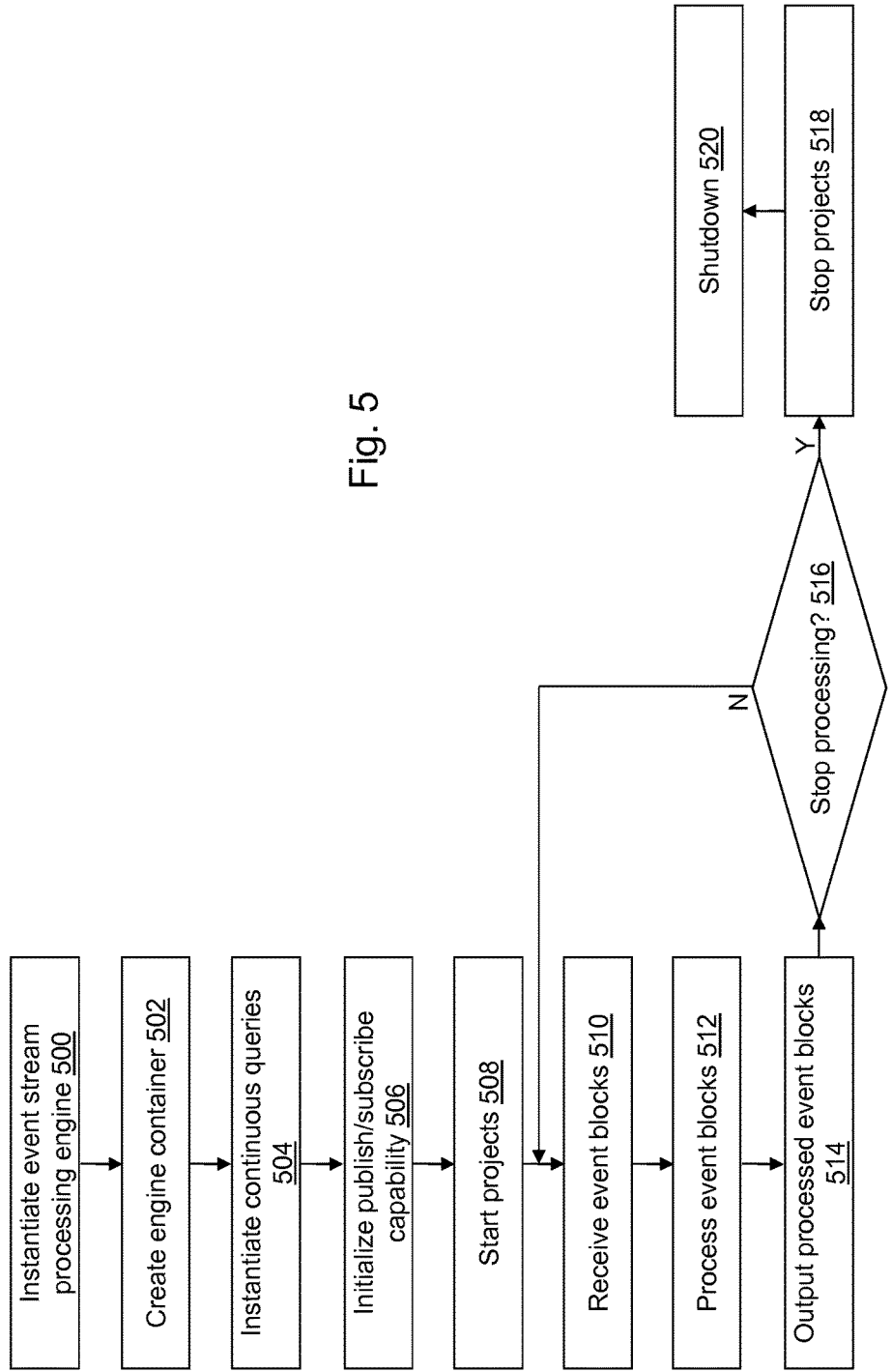
FIG. 5 depicts a flow diagram illustrating examples of operations performed by the ESP device of FIG. 4 in accordance with an illustrative embodiment.

Referring to FIG. 5, example operations associated with ESP application 416 are described. Additional, fewer, or different operations may be performed depending on the embodiment. The order of presentation of the operations of FIG. 5 is not intended to be limiting. A user can interact with one or more user interface windows presented to the user in third display 418 under control of ESP application 416 independently or through a browser application in an order selectable by the user. Although some of the operational flows are presented in sequence, the various operations may be performed in various repetitions, concurrently, and/or in other orders than those that are illustrated. For example, a user may execute ESP application 416, which causes presentation of a first user interface window, which may include a plurality of menus and selectors such as drop down menus, buttons, text boxes, hyperlinks, etc. associated with ESP application 416 as understood by a person of skill in the art. As further understood by a person of skill in the art, various operations may be performed in parallel, for example, using a plurality of threads.

Figure 6:
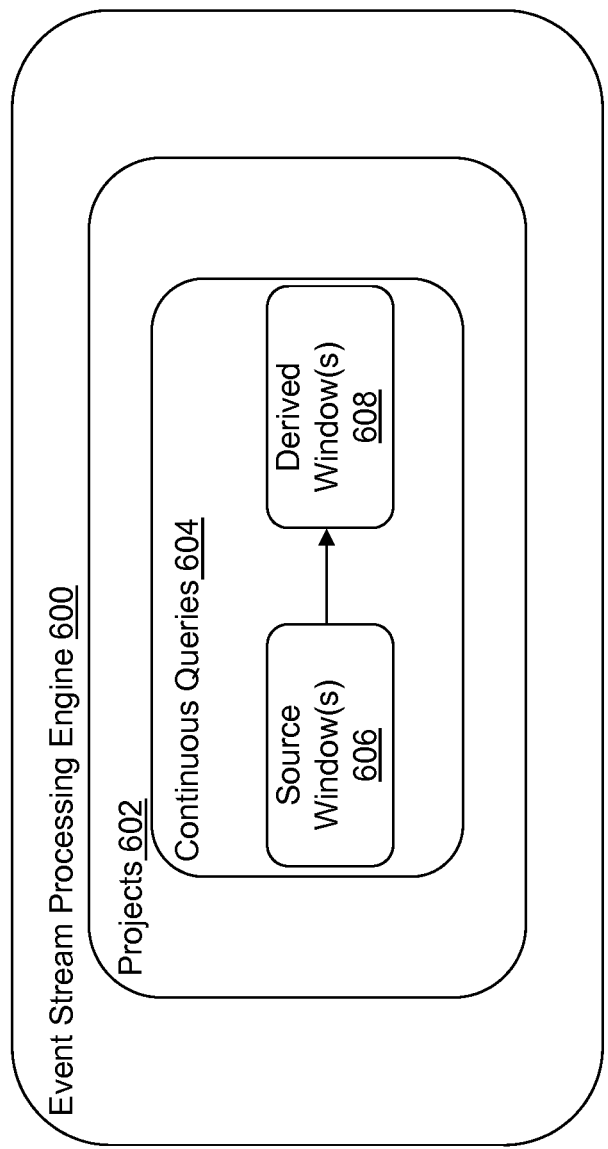
FIG. 6 depicts a block diagram of an ESP engine executing at the ESP device of FIG. 4 in accordance with an illustrative embodiment.

In an operation 500, an ESP application instance is instantiated at ESP device 102. In an operation 502, an engine container is created, which instantiates an ESP engine. For example, referring to FIG. 6, the components of an ESPE 600 executing at ESP device 102 are shown in accordance with an illustrative embodiment. ESPE 600 may include one or more projects 602. A project may be described as a second-level container in a model managed by ESPE 600 where a thread pool size for the project may be defined by a user. Each project of the one or more projects 602 may include one or more continuous queries 604 also referenced as a model. The one or more continuous queries 604 may include one or more source windows 606 and one or more derived windows 608. The engine container is the top-level container in a model that manages the resources of the one or more projects 602. In an illustrative embodiment, for example, there can be only one ESPE 600 for each instance of ESP application 416. ESPE 600 may or may not be persistent.

Continuous query modeling involves defining directed graphs of windows for event stream manipulation and transformation. A continuous query may be described as a directed graph of source, relational, pattern matching, and procedural windows. The one or more source windows 606 and the one or more derived windows 608 represent continuously executing queries that generate updates to a query result set as new event blocks stream through ESPE 600.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary ID for the event so ESPE 600 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a continuous flow of event block objects. A continuous query of the one or more continuous queries 604 transforms a source event stream made up of streaming event block objects published into ESPE 600 into one or more output event streams using the one or more source windows 606 and the one or more derived windows 608. A continuous query can also be thought of as data flow modeling.

The one or more source windows 606 are at the top of the directed graph and have no windows feeding into them. Event streams are published into the one or more source windows 606, and from there, the event streams are directed to the next set of connected windows as defined by the directed graph. The one or more derived windows 608 are all instantiated windows that are not source windows and that have other windows streaming events into them. The one or more derived windows 608 perform computations or transformations on the incoming event streams. The one or more derived windows 608 transform event streams based on the window type (that is operators such as join, filter, compute, aggregate, copy, pattern match, procedural, union, etc.) and window settings. As event streams are published into ESPE 600, they are continuously queried, and the resulting sets of derived windows in these queries are continuously updated.

Referring to FIG. 5, in an operation 504, the one or more continuous queries 604 are instantiated by ESPE 600 as a model. The one or more continuous queries 604 may be instantiated with a dedicated thread pool or pools that generate updates as new events stream through ESPE 600. For illustration, the one or more continuous queries 604 may be created to model business processing logic within ESPE 600. To create a continuous query, input event structures that are schemas with keys that flow into the one or more source windows 606 are identified. Output event structures that are also schemas with keys that will be generated by the one or more source windows 606 and/or the one or more derived windows 608 are also identified. The one or more source windows 606 and the one or more derived windows 608 are created based on the relational, pattern matching, and procedural algorithms that transform the input event streams into the output event streams.

ESPE 600 may analyze and process events in motion or "event streams." Instead of storing data and running queries against the stored data, ESPE 600 may store queries and stream data through them to allow continuous analysis of data as it is received.

In an operation 506, a publish/subscribe (pub/sub) capability is initialized for ESPE 600. In an illustrative embodiment, a pub/sub capability is initialized for each project of the one or more projects 602. To initialize and enable pub/sub capability for ESPE 600, a port number is provided. Pub/sub clients use the port number to establish pub/sub connections to ESPE 600.

Figure 7:
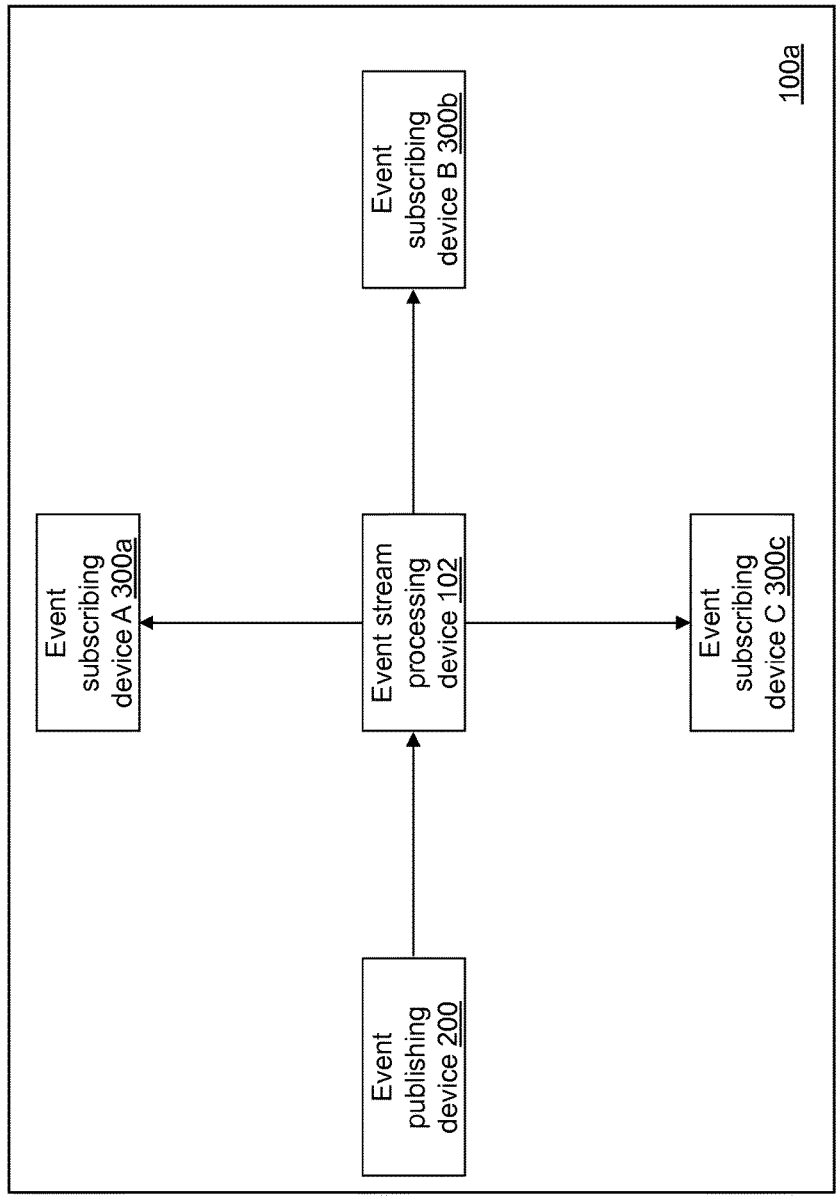
FIG. 7 depicts a block diagram illustrating interactions among the components of the ESP system of FIG. 1 in accordance with an illustrative embodiment.

Referring to FIG. 7, a first ESP system 100a may include ESP device 102, event publishing device 200, an event subscribing device A 300a, an event subscribing device B 300b, and an event subscribing device C 300c. Input event streams are output to ESP device 102 by event publishing device 200. In alternative embodiments, the input event streams may be created by a plurality of publishing devices of event publishing systems 104. The one or more continuous queries 604 instantiated by ESPE 600 analyze and process the input event streams to form output event streams output to event subscribing device A 300a, event subscribing device B 300b, and event subscribing device C 300c.

A pub/sub application programming interface (API) may be described as a library that enables an event publisher, such as event publishing device 200, to publish event streams into ESPE 600 or an event subscriber, such as event subscribing device A 300a, event subscribing device B 300b, and event subscribing device C 300c, to subscribe to event streams from ESPE 600. The pub/sub API provides cross-platform connectivity and endianness compatibility between ESP application 416 and other networked applications, such as event publishing application 224 instantiated at event publishing device 200 and event subscription application 324 instantiated at one or more of event subscribing device A 300a, event subscribing device B 300b, and event subscribing device C 300c. The pub/sub API may include an ESP object support library so the event publisher or the event subscriber can create or manipulate the events they send or receive, respectively. For example, event publishing application 224 may use the pub/sub API to send a stream of event blocks (event block objects) into ESPE 600, and event subscription application 324 may use the pub/sub API to receive a stream of event blocks from ESPE 600.

Referring to FIG. 5, operation 506 initializes the pub/sub capability of ESPE 600. In an operation 508, the one or more projects 602 are started. The one or more started projects may run in the background. In an operation 510, one or more event streams are received from one or more computing device of the event publishing systems 104 for example from event publishing device 200. An event block object containing one or more event objects is injected into a source window of the one or more source windows 606 from an instance of event publishing application 224.

Figure 8:
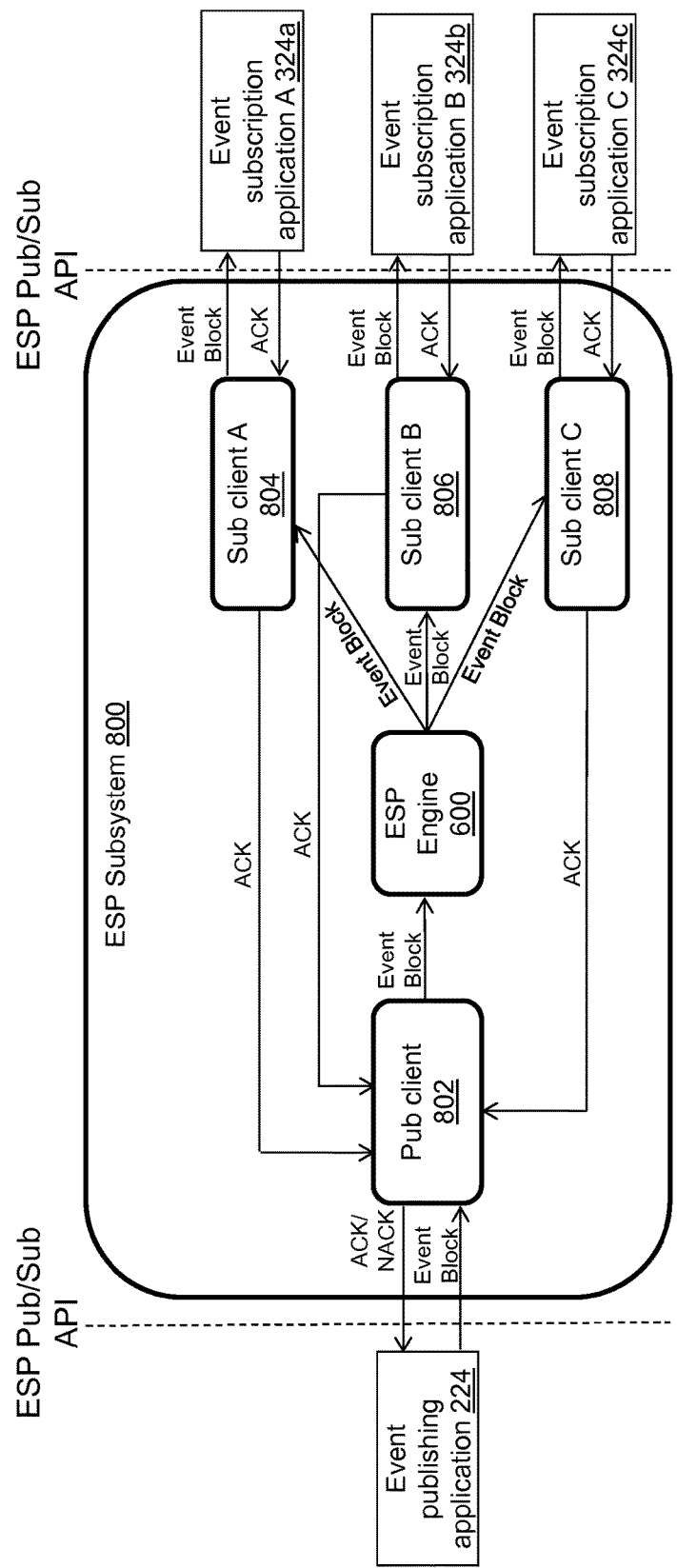
FIG. 8 depicts a second block diagram illustrating interactions among the components of the ESP system of FIG. 1 in accordance with an illustrative embodiment.

Referring to FIG. 8, an ESP subsystem 800 is shown interfacing between event publishing device 200 and event subscribing device A 300a, event subscribing device B 300b, and event subscribing device C 300c in accordance with an illustrative embodiment. ESP subsystem 800 may or may not be persistent. In the illustrative embodiment, ESP subsystem 800 includes a publishing client 802, ESPE 600, a subscribing client A 804, a subscribing client B 806, and a subscribing client C 808. Publishing client 802 is started by event publishing application 224 executing at event publishing 200 executing event publishing application 224 using the pub/sub API. Subscribing client A 804 is started by an event subscription application A 324a executing at event subscribing device A 300a using the pub/sub API. Subscribing client B 806 is started by an event subscription application B 324b executing at event subscribing device B 300b using the pub/sub API. Subscribing client C 808 is started by an event subscription application C 324c executing at event subscribing device C 300c using the pub/sub API.

The event block object is generated, for example, by event publishing application 224 and is received by publishing client 802. The unique ID is maintained as the event block object is passed between the one or more source windows 606 and/or the one or more derived windows 608 of ESPE 600, and to subscribing client A 804, subscribing client B 806, and subscribing client C 808 and to event subscription application A 324a, event subscription application B 324b, and event subscription application C 324c. Publishing client 802 may further generate and include a unique embedded transaction ID in the event block object as the event block object is absorbed into a continuous query, as well as the unique ID that event publishing device 200 assigned to the event block object. Besides the event block transaction ID, publishing client 802 may include a host identifier and port number field in the event block object to identify publishing client 802 as the source of the event block object. The host identifier and port number may be referenced as host/port. This meta information is carried with the event block object from the start of processing at a source window, through all stages of computation in derived windows, and on to any subscribing clients such as subscribing client A 804, subscribing client B 806, and subscribing client C 808.

In an operation 512, the one or more event streams are processed through the one or more continuous queries 604. In an operation 514, one or more processed event streams are output to one or more computing devices of the event subscribing systems 106 such as subscribing client A 804, subscribing client B 806, and subscribing client C 808. Subscribing client A 804, subscribing client B 806, and subscribing client C 808 send the received one or more processed event streams to event subscription application A 324a, event subscription application B 324b, and event subscription application C 324c, respectively. The event block transaction ID and host and port field identifying publishing client 802 need not be included in the event block objects streamed to event subscribing device A 300a, event subscribing device B 300b, and event subscribing device C 300c.

ESPE 600 maintains the event block containership aspect of the received event blocks from when the event block is published into a source window and works its way through the directed graph with the various event translations before being output to subscribers. Subscribers can correlate a group of subscribed events back to a group of published events by comparing the unique ID of the event block object that a publisher, such as event publishing device 200, attached to the event block object with the event block ID received by the subscriber.

In an operation 516, a determination is made concerning whether or not processing is stopped. If processing is not stopped, processing continues in operation 510 to continue receiving the one or more event streams from the one or more computing devices of the event publishing systems 104. If processing is stopped, processing continues in an operation 518. In operation 518, the started projects are stopped. In operation 520, ESPE 600 is shutdown.

Figure 9A:
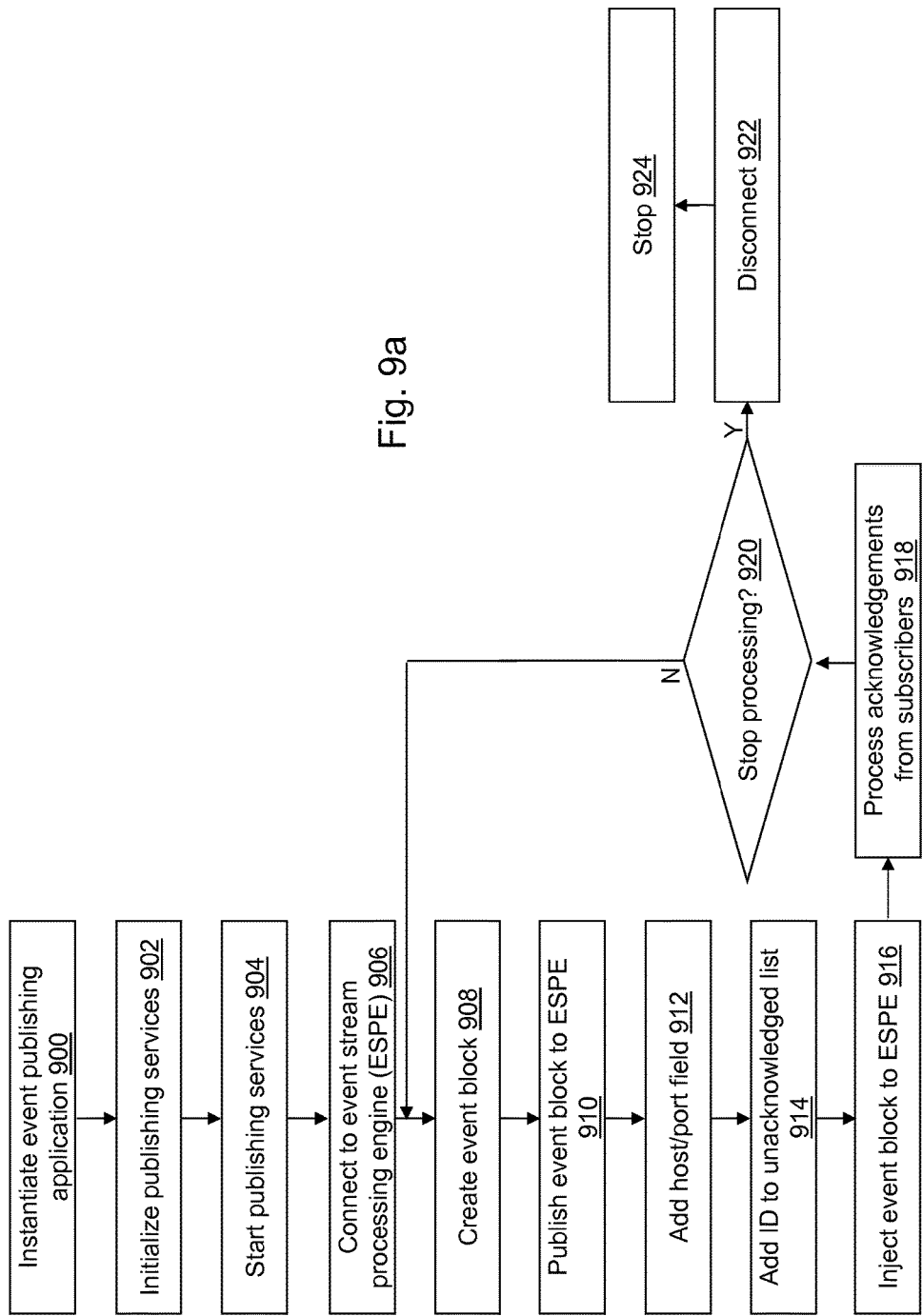
FIGS. 9a and 9b depict flow diagrams illustrating examples of operations performed by the publishing device of FIG. 2 in accordance with an illustrative embodiment.
Figure 9B:
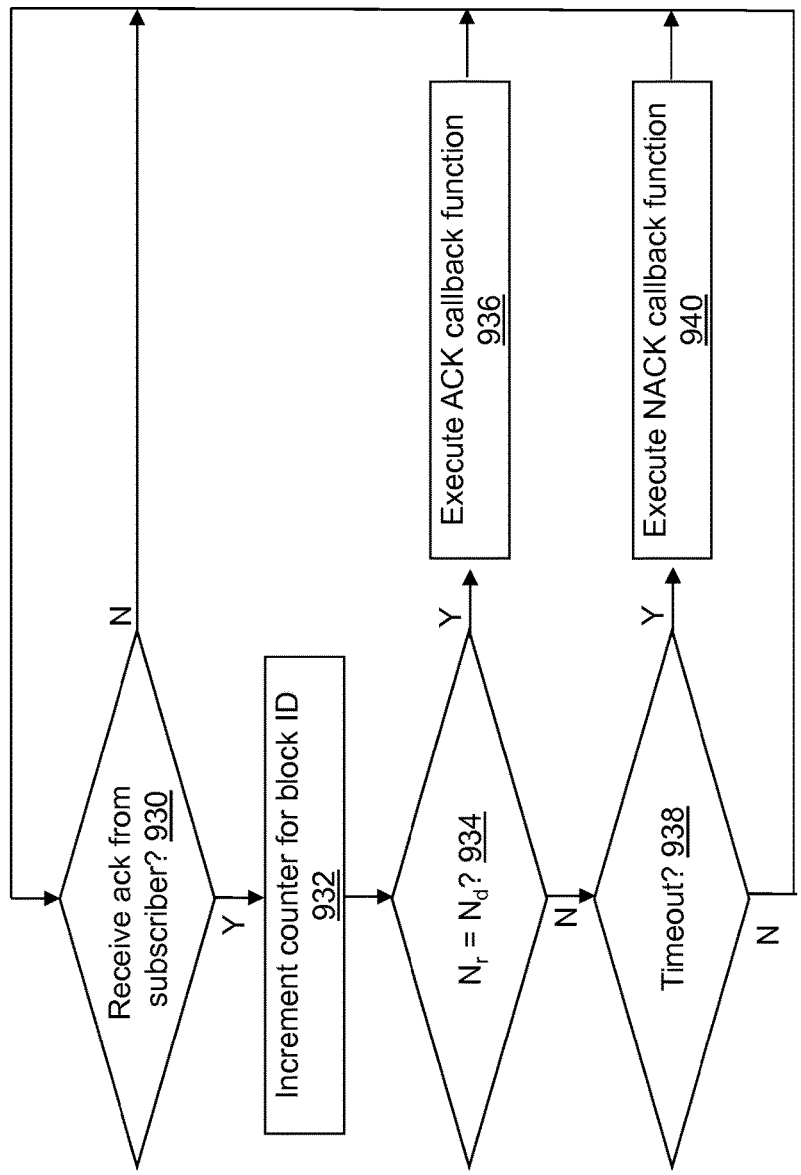

Referring to FIGS. 9a and 9b, example operations associated with event publishing application 224 are described. Additional, fewer, or different operations may be performed depending on the embodiment. The order of presentation of the operations of FIGS. 9a and 9b is not intended to be limiting. A user can interact with one or more user interface windows presented to the user in display 218 under control of event publishing application 224 independently or through use of a browser application in an order selectable by the user. Although some of the operational flows are presented in sequence, the various operations may be performed in various repetitions, concurrently, and/or in other orders than those that are illustrated. For example, a user may execute event publishing application 224, which causes presentation of a first user interface window, which may include a plurality of menus and selectors such as drop down menus, buttons, text boxes, hyperlinks, etc. associated with event publishing application 224 as understood by a person of skill in the art. As further understood by a person of skill in the art, various operations may be performed in parallel.

In an operation 900, an event publishing application is instantiated at event publishing device 200. In an operation 902, publishing services are initialized. In an operation 904, the initialized publishing services are started, which creates a publishing client, such as publishing client 802, for the instantiated event publishing application 224. The publishing client, such as publishing client 802, performs the various pub/sub activities for the instantiated event publishing application 224. For example, a URL to ESPE 600 including the port number is passed to a "Start" function. The "Start" function may validate and retain the connection parameters for a specific publishing client connection and return a pointer to the publishing client. For illustration, the URL may be formatted as "dfESP://<hostname>:<port>/<project name>/<continuous query name>/<window name>".

When the publishing client is started, a number of acknowledged subscribers required to acknowledge delivery of the event block objects from the publishing client 802, on behalf of the instantiated event publishing application 224, is specified. A time-out value used to generate negative acknowledgements upon non-receipt of acknowledgements from the specified number of acknowledged subscribers may also be specified. For illustration, the instantiated event publishing application 224 may identify a configuration file that includes the number of acknowledged subscribers expected to acknowledge delivery of the event block objects, the time-out value, and a port number for the publishing client to send acknowledgement messages to the instantiated event publishing application 224. The publishing client may read the identified configuration file to define these values.

As already explained, each event block object sent by the instantiated event publishing application 224 contains a unique ID set by the instantiated event publishing application 224. This unique ID is passed back to the instantiated event publishing application 224 from the publishing client with every acknowledgement (ACK) and negative acknowledgement (NACK) under control of a publisher user-defined callback function registered when the publishing client is started. For example, a pointer to a successful (ACK) callback function and to an unsuccessful (NACK) callback function may be passed to the publishing client when the publishing client is started by the instantiated event publishing application 224. In an illustrative embodiment, a unique ID may be requested from the publishing client by the instantiated event publishing application 224 for each event block object sent.

In an operation 906, a connection is made between the instantiated event publishing application 224 and ESPE 600. To make the connection, the pointer to the created publishing client may be passed to a "Connect" function and a mostly non-busy wait loop created to wait for receipt of event block objects from the instantiated event publishing application 224. For illustration, a server listener socket is opened on the designated port number to allow publishing client 802 to connect to ESPE 600 for pub/sub services. Once the connection request is made for pub/sub by a client, an ephemeral port may be returned, which the pub/sub API uses for this connection. Where it is preferable to override the ephemeral port for a specific port (i.e., for security) that can be done by providing the preferred port to be used for the actual connection to the project.

In an operation 908, an event block object is created by the instantiated event publishing application 224. In an operation 910, the created event block is published to ESPE 600. The instantiated event publishing application 224 passes the created event block to the publishing client, where the unique ID field in the event block object has been set by the instantiated event publishing application 224 possibly after being requested from the publishing client. In an illustrative embodiment, the instantiated event publishing application 224 may wait to begin publishing until a "Ready" callback has been received from the publishing client. The "Ready" callback indicates that the number of acknowledged subscribers have established their connections back to the publishing client. If too many subscribers attempt to connect to the publishing client, any additional connections may be refused, and an error message logged.

In an operation 912, the publishing client adds the host/port field to the event block object. For illustration, the host/port field is 64 bits with 32 bits used for the host identified and 32 bits used for the port number. In an operation 914, the publishing client adds the unique ID to an unacknowledged ID list. In an operation 916, the publishing client injects the event block object with the added host/port field to ESPE 600. In an illustrative embodiment, if the instantiated event publishing application 224 injects an event block that contains a unique ID already present in the unacknowledged ID list, the publication may be rejected by the publishing client, and an error message logged. The event block object is injected into the source window, continuous query, and project associated with the publishing client.

In an operation 918, acknowledgements from subscribing clients are processed. For example, referring to FIG. 9b, in an operation 930, an acknowledgement is received from an event subscribing client, such as from subscribing client A 804, subscribing client B 806, or subscribing client C 808. Acknowledgements may be processed as they are received and may be performed in parallel with one or more operations of FIG. 9a.

In an operation 932, a counter is incremented for the unique ID and processing continues at an operation 934. In operation 934, a determination is made concerning whether or not the number of acknowledgements received ($N_r$) equals the number of acknowledged subscribers specified for the block ID ($N_d$). If $N_r < N_d$, processing continues in an operation 938. If $N_r = N_d$, processing continues in an operation 936. In operation 936, the successful (ACK) callback function is executed and processing continues at operation 930 to process any additional acknowledgements. For example, the successful (ACK) callback function may remove the event block object from a recoverable location once the event block object has been delivered and an acknowledgement received from the specified number of acknowledged subscribers. An acknowledgement message may be sent to the port number for the instantiated event publishing application 224. The acknowledgement message indicates that the specified number of acknowledged subscribers acknowledged receipt of the event block object. The unique ID for the event block object may be removed from the unacknowledged ID list.

In operation 938, a determination is made concerning whether or not a timeout period determined based on the time-out value has expired. If the timeout period has not expired, processing continues in operation 930 to process any additional acknowledgements. If the timeout period has expired, processing continues in an operation 940. In operation 940, the failed (NACK) callback function is executed, and processing continues at operation 930 to process any additional acknowledgements. For example, the failed callback function may resend the event block object. A failed message may be sent to the port number for the instantiated event publishing application 224. The failed message indicates that the specified number of acknowledged subscribers did not acknowledge receipt of the event block object. The unique ID for the event block object may be removed from the unacknowledged ID list.

Referring to FIG. 9a, in an operation 920, a determination is made concerning whether or not processing is stopped. If processing is not stopped, processing continues in operation 908 to continue creating and publishing event block objects. If processing is stopped, processing continues in an operation 922. In operation 922, the connection made between the instantiated event publishing application 224 and ESPE 600 through the publishing client is disconnected. In operation 924, the instantiated event publishing application 224 and the publishing client are stopped.

Figure 10:
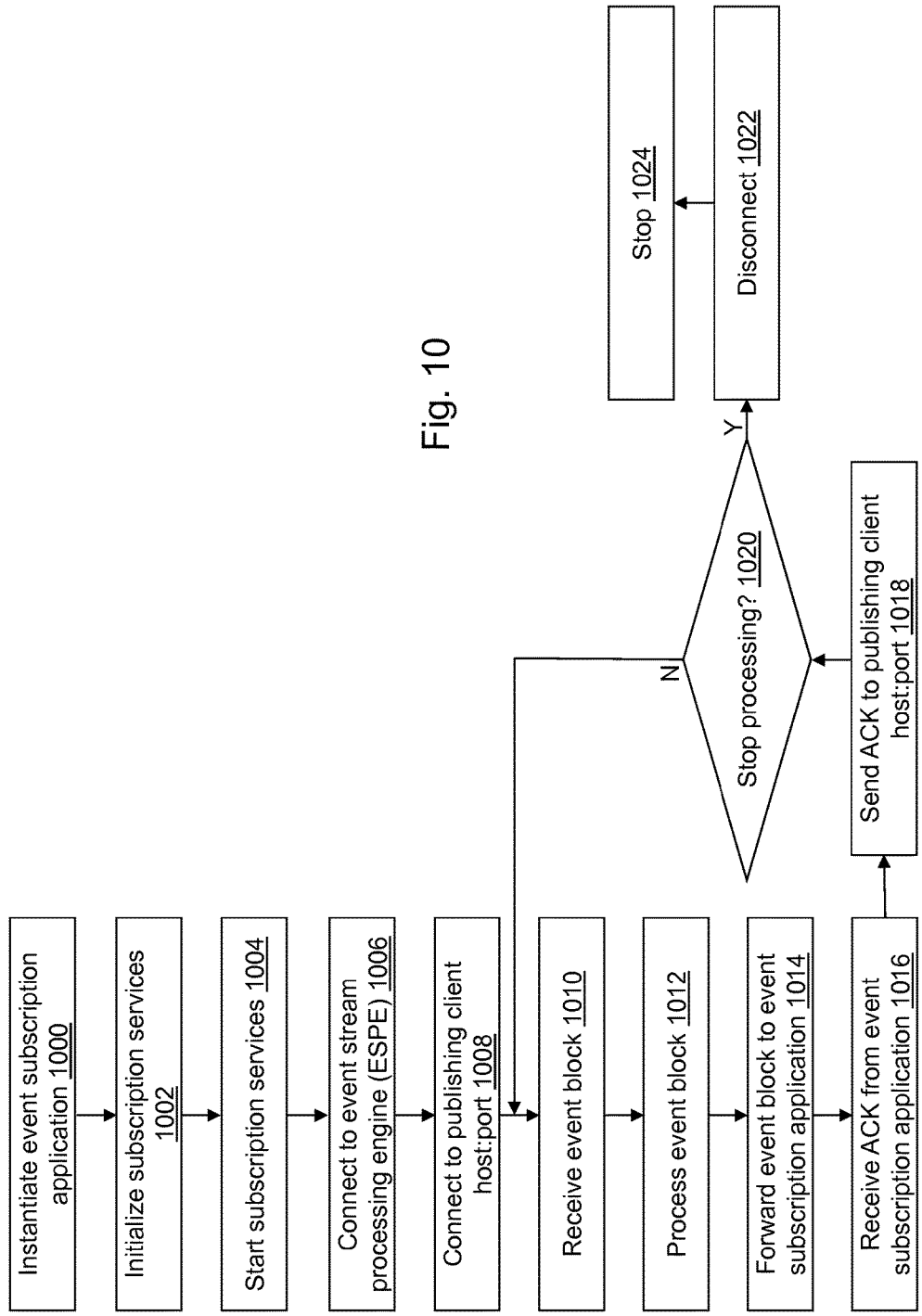
FIG. 10 depicts a flow diagram illustrating examples of operations performed by the subscribing device of FIG. 3 in accordance with an illustrative embodiment.

Referring to FIG. 10, example operations associated with event subscription application 324 are described. Additional, fewer, or different operations may be performed depending on the embodiment. The order of presentation of the operations of FIG. 10 is not intended to be limiting. A user can interact with one or more user interface windows presented to the user in second display 318 under control of event subscription application 324 independently or through a browser application in an order selectable by the user. Although some of the operational flows are presented in sequence, the various operations may be performed in various repetitions, concurrently, and/or in other orders than those that are illustrated. For example, a user may execute event subscription application 324, which causes presentation of a first user interface window, which may include a plurality of menus and selectors such as drop down menus, buttons, text boxes, hyperlinks, etc. associated with event subscription application 324 as understood by a person of skill in the art. As further understood by a person of skill in the art, various operations may be performed in parallel.

In an operation 1000, an instance of event subscription application 324 is instantiated at event subscribing device 300. In an operation 1002, subscription services are initialized. In an operation 1004, the initialized subscription services are started, which creates a subscribing client, such as subscribing client A 804, on behalf of the instantiation of event subscription application 324 at event subscribing device 300. The subscribing client, such as subscribing client A 804, performs the various pub/sub activities for that instantiation. For example, a URL to ESPE 600 including the port number is passed to a "Start" function. The "Start" function may validate and retain the connection parameters for a specific subscribing client connection and return a pointer to the subscribing client. For illustration, the URL may be formatted as "dfESP://<hostname>:<port>/<project name>/<continuous query name>/<window name>".

In an operation 1006, a connection is made between the instantiated event subscription application 324 and ESPE 600 through the created subscribing client. When a subscribe connection is started, the subscribing client, such as subscribing client A 804, is passed a set of acknowledged delivery publishers, such as publishing client 802, as a list of host and port entries. To make the connection, the pointer to the created subscribing client may be passed to a "Connect" function and a mostly non-busy wait loop created to wait for receipt of event block objects.

For illustration, a server listener socket is opened on the designated port number to allow subscribing client A 804, subscribing client B 806, and subscribing client C 808 to connect to ESPE 600 for pub/sub services. Once the connection request is made for pub/sub by a subscribing client, an ephemeral port may be returned, which the pub/sub API uses for this connection. Where it is preferable to override the ephemeral port for a specific port (i.e., for security) that can be done by providing the preferred port to be used for the actual connection to the project.

In an operation 1008, a connection is made between the subscribing client and the event publishing client using the host and port number included with the received event block object. ESPE 600 is bypassed in the connection as shown referring to FIG. 8. If the subscribing client fails to establish its connection to the event publishing client, the subscribing client may retry at a user defined rate up to a user defined maximum number of retries. For illustration, the instantiated event subscription application 324 may identify a configuration file that includes a list of host/port entries for the publishing clients from which the instantiated event subscription application 324 wants to receive acknowledged delivery of event block objects. The subscribing client may read the identified configuration file to define the host/port values and the values for the user defined rate and the user defined maximum number of retries.

In an operation 1010, an event block object is received by the subscribing client. For illustration, when a new window event arrives a callback function may be invoked to handle the received event block object. In an operation 1012, the received event block object is processed by the created subscribing client. In an operation 1014, the received event block object is forwarded to the instantiated event subscription application 324.

In an operation 1016, an acknowledgement message is received from the instantiated event subscription application 324. For example, upon completion of processing of the event block object, the instantiated event subscription application 324 calls a pub/sub API function with an event block pointer that indicates that the event block object has been successfully processed at the instantiated event subscription application 324.

In an operation 1018, an acknowledgement message is sent to the publishing client including the unique ID of the event block object using the connection established in operation 1008. The subscribing client may receive event streams from a plurality of publishing clients. The subscribing client may have established a plurality of connections in operation 1008 with the plurality of publishing clients. In this case, the host/port values included with the event block object are used to determine on which connection the acknowledgement message is sent. The host/port values included with the event block object are compared to the host/port values in the list of list of host/port entries for the publishing clients to determine the connection used. If only a single publishing client may be subscribed to, for example, the host/port information need not be in the event block object.

In an operation 1020, a determination is made concerning whether or not processing is stopped. If processing is not stopped, processing continues in operation 1008 to continue receiving and processing event block objects. If processing is stopped, processing continues in an operation 1022. In operation 1022, the connection made between the instantiated event subscription application 324 and ESPE 600 through the subscribing client is disconnected. In operation 1024, the instantiated event subscription application 324 and the subscribing client are stopped.

Connection information includes host/port information. However, in alternative embodiments, other connection information may be used based on the type of connection established between the various components of ESP system 100 as understood by a person of skill in the art.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. A non-transitory computer-readable medium having stored thereon computer-readable instructions that when executed by a computing device cause the computing device to:
   instantiate a continuous query that includes a source window to receive an event block object and a derived window connected to the source window to process the event block object received by the source window and to output the processed event block object to a plurality of subscribing clients;
   establish a first connection between a publishing device executing an event publishing application and an event publishing client;
   establish a second connection between the event publishing client and an event stream processing engine (ESPE) executing the instantiated continuous query, wherein the event publishing client sends the received event block object to the source window;
   establish a third connection between the ESPE and each of a plurality of subscribing clients;
   establish a fourth connection between each subscribing client of the plurality of subscribing clients and an associated subscribing device executing an event subscription application;
   establish a fifth connection between each subscribing client of the plurality of subscribing clients and the event publishing client, wherein the second connection differs from each fifth connection, and each fifth connection is a direct connection that is not through the ESPE;
   receive, by the event publishing client, the event block object from the publishing device using the established first connection;
   publish the received event block object to the source window of the ESPE using the established second connection, wherein the event block object includes a unique identifier;
   perform, by the ESPE, a computation on a field extracted from the event block object based on the instantiated continuous query to define a processed event block object;
   output, by the ESPE, the defined, processed event block object to each subscribing client of the plurality of subscribing clients using the established third connection to each subscribing client, wherein the output event block object includes the unique identifier;
   send, by each subscribing client, the output event block object to the associated subscribing device using the established fourth connection;
   receive, by each subscribing client, an acknowledgement message from the associated subscribing device using the established fourth connection when the sent event block object is successfully processed by the associated subscribing device;
   send, by each subscribing client, a second acknowledgement message to the event publishing client using the established fifth connection when the acknowledgement message is received, wherein the second acknowledgement message includes the unique identifier;
   receive, by the event publishing client, each sent second acknowledgement message;
   for each received second acknowledgement message including the unique identifier, increment, by the event publishing client, a counter to determine a number of second acknowledgement messages received;
   compare, by the event publishing client, the number of second acknowledgement messages received to a specified number of acknowledged subscribers;
   based on the comparison and responsive to determining that the number of second acknowledgement messages received is less than the specified number of acknowledged subscribers, determine, by the event publishing client, if a timeout period has expired; and
   responsive to determining that the timeout period has expired, execute a failed callback function.

2. The non-transitory computer-readable medium of claim 1, wherein connection information to establish the second connection includes a host identifier and a port number.

3. The non-transitory computer-readable medium of claim 1, wherein connection information to establish the third connection includes a host identifier and a port number.

4. The non-transitory computer-readable medium of claim 1, wherein connection information to establish each fourth connection is received from an instance of the event subscription application executing at the associated subscribing device.

5. The non-transitory computer-readable medium of claim 1, wherein a determination that the event block object: is successfully processed is performed by an instance of the event subscription application.

6. The non-transitory computer-readable medium of claim 1, wherein connection information to establish each fourth connection is received by reading a configuration file identified by an instance of the event subscription application.

7. The non-transitory computer-readable medium of claim 1, wherein the event block object further includes connection information and the computer-readable instructions further cause the computing device to establish each fifth connection based on the connection information included in the event block object.

8. The non-transitory computer-readable medium of claim 1, wherein the computer-readable instructions further cause the computing device to:
   execute a successful callback function based on the comparison and responsive to determining that the number of acknowledgement messages received equals the number of acknowledgement messages specified for the unique identifier.

9. The non-transitory computer-readable medium of claim 1, wherein the computer-readable instructions further cause the computing device to:
before receiving each sent second acknowledgement message, add, by the event publishing client, the unique identifier to an unacknowledged identifier list; and
responsive to determining that the timeout period has expired, remove, by the event publishing client, the unique identifier from the unacknowledged identifier list.

10. The non-transitory computer-readable medium of claim 1, wherein the computer-readable instructions further cause the computing device to remove, by the event publishing client, the unique identifier from the unacknowledged identifier list in response to determining that the number of acknowledgement messages received is equal to the number of acknowledgement messages specified for the unique identifier.

11. The non-transitory computer-readable medium of claim 1, wherein the failed callback function republishes the received event block object to the source window of the ESPE using the established second connection.

12. The non-transitory computer-readable medium of claim 1, wherein the failed callback function sends a failed message to the publishing device.

13. The non-transitory computer-readable medium of claim 1, wherein the failed callback function is executed using a pointer to the failed callback function.

14. The non-transitory computer-readable medium of claim 13, wherein the pointer is sent to the event publishing client from the publishing device by the event publishing application.

15. The non-transitory computer-readable medium of claim 8, wherein the successful callback function is executed using a pointer to the successful callback function.

16. The non-transitory computer-readable medium of claim 15, wherein the successful callback function removes the event block object from a recoverable location.

17. A system comprising:
a processor; and
a non-transitory computer-readable medium operably coupled to the processor, the computer-readable medium having computer-readable instructions stored thereon that, when executed by the processor, cause the system to
instantiate a continuous query that includes a source window to receive an event block object and a derived window connected to the source window to process the event block object received by the source window and to output the processed event block object to a plurality of subscribing clients;
establish a first connection between a publishing device executing an event publishing application and an event publishing client;
establish a second connection between the event publishing client and an event stream processing engine (ESPE) executing the instantiated continuous query, wherein the event publishing client sends the received event block object to the source window;
establish a third connection between the ESPE and each of a plurality of subscribing clients;
establish a fourth connection between each subscribing client of the plurality of subscribing clients and an associated subscribing device executing an event subscription application;
establish a fifth connection between each subscribing client of the plurality of subscribing clients and the event publishing client, wherein the second connection differs from each fifth connection, and each fifth connection is a direct connection that is not through the ESPE;
receive, by the event publishing client, the event block object from the publishing device using the established first connection;
publish the received event block object to the source window of the ESPE using the established second connection, wherein the event block object: includes a unique identifier;
perform, by the ESPE, a computation on a field extracted from the event block object based on the instantiated continuous query to define a processed event: block object;
output, by the ESPE, the defined, processed event block object to each subscribing client of the plurality of subscribing clients using the established third connection to each subscribing client, wherein the output event block object includes the unique identifier;
send, by each subscribing client, the output event block object to the associated subscribing device using the established fourth connection;
receive, by each subscribing client, an acknowledgement message from the associated subscribing device using the established fourth connection when the sent event block object is successfully processed by the associated subscribing device;
send, by each subscribing client a second acknowledgement message to the event publishing client using the established fifth connection when the acknowledgement message is received;
receive by the event publishing client, each sent second acknowledgement message;
for each received second acknowledgement message including the unique identifier increment, by the event publishing client, a counter to determine a number of second acknowledgement messages received;
compare, by the event publishing client, the number of second acknowledgement messages received to a specified number of acknowledged subscribers;
based on the comparison and responsive to determining that the number of second acknowledgement messages received is less than the specified number of acknowledged subscribers, determine, by the event publishing client, if a timeout period has expired; and
responsive to determining that the timeout period has expired, execute a failed callback function.

18. The system of claim 17, wherein the event block object further includes connection information and the computer-readable instructions further cause the computing device to establish each fifth connection based on the connection information included in the event block object.

19. The system of claim 17, wherein the computer-readable instructions further cause the computing device to;
execute a successful callback function based on the comparison and responsive to determining that the number of acknowledgement messages received equals the number of acknowledgement messages specified for the unique identifier.

20. The system of claim 17, wherein the computer-readable instructions further cause the computing device to: before receiving each sent second acknowledgement message, add, by the event publishing client the unique identifier to an unacknowledged identifier list; and responsive to determining that the timeout period has expired, remove, by the event publishing client, the unique identifier from the unacknowledged identifier list.

21. The system of claim 20, wherein the computer-readable instructions further cause the computing device to remove, by the event publishing client, the unique identifier from the unacknowledged identifier list in response to determining that the number of acknowledgement messages received is equal to the number of acknowledgement messages specified for the unique identifier.

22. The system of claim 17, wherein the failed callback function is executed using a pointer to the failed callback function.

23. The system of claim 17, wherein the failed callback function republishes the received event block object to the source window of the ESPE using the established second connection.

24. The system of claim 17, wherein the failed callback function sends a failed message to the publishing device.

25. A method of confirming receipt of an event block object the method comprising:
  instantiating a continuous query that includes a source window to receive an event block object and a derived window connected to the source window to process the event block object received by the source window and to output the processed event block object to a plurality of subscribing clients;
  establishing a first connection between a publishing device executing an event publishing application and an event publishing client;
  establishing a second connection between the event publishing client and an event stream processing engine (ESPE) executing the instantiated continuous wherein the event publishing client sends the received event block object to the source window;
  establishing a third connection between the ESPE and each of a plurality of subscribing clients;
  establishing a fourth connection between each subscribing client of the plurality of subscribing clients and an associated subscribing device executing an event subscription application;
  establishing a fifth connection between each subscribing client of the plurality of subscribing clients and the event publishing client, wherein the second connection differs from each fifth connection, and each fifth connection is a direct connection that is not through the ESPE;
  receiving, by the event publishing client, the event block object from the publishing device using the established first connection;
  publishing the received event block object to the source window of the ESPE using the established second connection, wherein the event block object includes a unique identifier;
  performing, by the ESPE, a computation on a field extracted from t:he event block object based on the instantiated continuous query to define a processed event block object;
  outputting, by the ESPE, the defined, processed event block object to each subscribing client of the plurality of subscribing clients using the established third connection to each subscribing wherein the output event block object includes the unique identifier;
  sending, by each subscribing client, the output event block object to the associated subscribing device using the established fourth connection;
  receiving, by each subscribing client, an acknowledgement message from the associated subscribing device using the established fourth connection when the sent event block object is successfully processed by the associated subscribing device;
  sending, by each subscribing client, a second acknowledgement message to the event publishing client using the established fifth connection when the acknowledgement: message is received, wherein the second acknowledgement message includes the unique identifier;
  receiving, by the event publishing client, each sent second acknowledgement message;
  for each received second acknowledgement message including the unique identifier, incrementing, by t:he event publishing client, a counter to determine a number of second acknowledgement messages received;
  comparing, by the event publishing client, the number of second acknowledgement messages received to a specified number of acknowledged subscribers;
  based on the comparison and responsive to determining that the number of second acknowledgement messages received is less than the specified number of acknowledged subscribers, determining, by the event publishing client, if a timeout period has expired; and
  responsive to determining that the timeout period has expired, executing a failed callback function.

26. The method of claim 25, wherein connection information to establish each fourth connection is received from an instance of the event subscription application executing at the associated subscribing device.

27. The method of claim 25, wherein a determination that the event block object is successfully processed is performed by an instance of the event subscription application.

28. The method of claim 25, further comprising:
  executing a successful callback function based on the comparison and responsive to determining that the number of acknowledgement messages received equals the number of acknowledgement messages specified for the unique identifier.

29. The method of claim 25, wherein the failed callback function is executed using a pointer to the failed callback function.

30. The method of claim 25, wherein connection information to establish the third connection includes a host identifier and a port number.

31. The method of claim 25, wherein connection information to establish each fourth connection is received by reading a configuration file identified by an instance of the event subscription application.

32. The method of claim 25, further comprising establishing each fifth connection based on connection information included in the event block object.

33. The method of claim 25, further comprising:
  before receiving each sent second acknowledgement message, adding, by the event publishing client, the unique identifier to an unacknowledged identifier list; and
  responsive to determining that the timeout period has expired, removing, by the event publishing client, the unique identifier from t:he unacknowledged identifier list.

34. The method of claim 33, further comprising removing, by the event publishing client, the unique identifier from the unacknowledged identifier list in response to determining that the number of acknowledgement messages received is equal to the number of acknowledgement messages specified for the unique identifier.

35. The method of claim 25, wherein the failed callback function republishes the received event block object to the source window of the ESPE using the established second connection.

36. The method of claim 25, wherein the failed callback function sends a failed message to the publishing device.

37. The method of claim 25, wherein establishing the first connection, establishing the second connection, establishing the third connection, establishing the fourth connection, and establishing the fifth connection can be performed in any order.

* * * * *